(12) United States Patent
Hiltz

(10) Patent No.: US 7,147,907 B1
(45) Date of Patent: Dec. 12, 2006

(54) PROTECTIVE COVERING FOR LANDSCAPE TIES AND TIMBERS AND OTHER BUILDING MATERIALS

(76) Inventor: Robert L. Hiltz, 7 Gerald Rd., Stoneham, MA (US) 02180

( * ) Notice: Subject to any disclaimer, the term of this patent is extended or adjusted under 35 U.S.C. 154(b) by 8 days.

(21) Appl. No.: 10/609,905

(22) Filed: Jun. 30, 2003

(51) Int. Cl.
*B32B 3/04* (2006.01)

(52) U.S. Cl. .................. 428/122; 428/83; 428/133; 428/57; 428/58; 428/59; 428/60; 428/61; 428/62; 428/99; 428/68; 428/76; 248/345.1; 52/723.2; 52/730.7; 52/716.2; 52/300; 52/483.1; 52/403.1; 52/480; 52/177

(58) Field of Classification Search ............... 428/122, 428/133, 57–62, 99, 68, 76; 248/345.1; 52/723.2, 52/480, 730.7, 300, 716.2, 177, 483.1, 403.1
See application file for complete search history.

(56) References Cited

U.S. PATENT DOCUMENTS

| | | | | |
|---|---|---|---|---|
| 4,265,062 A | * | 5/1981 | Klibofske ................... 52/97 |
| 4,356,968 A | | 11/1982 | Harmsen ..................... 238/1 |
| 4,489,884 A | | 12/1984 | Harmsen ..................... 238/1 |
| 4,609,144 A | | 9/1986 | Harmsen ..................... 238/1 |
| 4,648,554 A | | 3/1987 | McQueen ................. 238/283 |
| 4,660,495 A | | 4/1987 | Thompson ................. 114/263 |
| 4,824,627 A | | 4/1989 | Hammer et al. ........ 264/211.21 |
| 4,858,399 A | | 8/1989 | Salato, Jr. ................... 52/97 |
| 4,907,387 A | * | 3/1990 | Turnbull ..................... 52/177 |
| 4,910,910 A | | 3/1990 | Jones .......................... 47/33 |
| 4,943,226 A | * | 7/1990 | Pottorff ................... 425/326.1 |
| 4,991,834 A | | 2/1991 | Vaux .......................... 272/3 |
| 5,026,207 A | | 6/1991 | Heath ........................ 405/46 |
| 5,148,644 A | * | 9/1992 | Weir .......................... 52/300 |
| 5,283,994 A | | 2/1994 | Callison ..................... 52/71 |
| 5,348,386 A | * | 9/1994 | Grass ..................... 312/348.2 |
| 5,525,416 A | | 6/1996 | Katz et al. .................. 428/283 |
| 5,542,787 A | | 8/1996 | Charlanow ................. 405/258 |
| 5,613,339 A | | 3/1997 | Pollock ..................... 52/731.1 |
| 5,625,985 A | * | 5/1997 | Johnson ..................... 52/177 |
| 5,713,517 A | | 2/1998 | Loison ....................... 238/2 |
| 5,730,357 A | | 3/1998 | Besenschek et al. ........ 238/283 |
| 5,791,559 A | | 8/1998 | Fox et al. ................... 238/218 |
| 5,961,093 A | | 10/1999 | Jones et al. ................ 248/678 |
| 5,961,389 A | | 10/1999 | Dickinson .................. 472/92 |
| 5,971,516 A | * | 10/1999 | Huber ..................... 312/348.1 |

(Continued)

OTHER PUBLICATIONS

U.S. Consumer Product Safety Commission, "Public Playground Safety Checklist." Retrieved from www.kaboom.org on Jun. 30, 2002. Copyright © 2002 KaBOOM! Inc.

(Continued)

*Primary Examiner*—Patrick Joseph Ryan
*Assistant Examiner*—Jane Rhee
(74) *Attorney, Agent, or Firm*—Burns & Levinson LLP; Jacob N. Erlich; Peter J. Borghetti

(57) ABSTRACT

Apparatus and methods for preventing splinters and minimizing the number of injuries attributable to falling onto pressure-treated wooden members, such as landscape ties or timbers used in play areas and landscape projects, through the use of a resilient cover. A cover and various embodiments include a moldable or extrudable waterproof material in the form of a channel having a top wall and two opposing side walls. The combination of channel thickness and composition provides an impact resistance suitable to prevent injuries when one falls upon it. The inner dimensions of the channel are such that the channel fits tightly over the top and sides of a construction beam or timber.

2 Claims, 4 Drawing Sheets

U.S. PATENT DOCUMENTS 6,021,958 A 2/2000 Smith .......................... 238/83
6,216,395 B1* 4/2001 Kelly .......................... 49/467

OTHER PUBLICATIONS

"Home Playground Safety Checklist." Retrieved from www.pueblo.gsa.gov on Jun. 30, 2002.

Consumer Product Safety Commission, "Public Playground Safety Checklist." Retrieved from www.cpsc.gov on Aug. 4, 2002.

U.S. Consumer Product Safety Commission, "Playground Safety Publications." Retrieved from www.cpsc.gov on Aug. 2, 2002.

The Climbing Thing, "Slopes and Slides." Retrieved from www.theclimbingthing.com on Aug. 25, 2002.

* cited by examiner

PROTECTIVE COVERING FOR LANDSCAPE TIES AND TIMBERS AND OTHER BUILDING MATERIALS

FIELD OF THE INVENTION

The present invention relates generally to protective covers, and more specifically to shaped resilient covers and methods of covering or retrofitting pressure-treated wooden construction materials, such as landscape ties and timbers used in play areas and in landscaping projects, with said covers.

BACKGROUND OF THE INVENTION

Pressure-treated wood beams are used frequently in defining boundaries of landscape projects and play areas, such as swing sets, sandboxes and bocce courts. Pressure-treated woods are used because of their durable nature, and are commonly treated with chemical preservatives.

Safety checklists for public and private playgrounds have been issued by the U.S. Consumer Product Safety Commission ("CPSC", www.cpsc.gov/kids/kidsafety/plgdlist.pdf) and KaBOOM!™, a non-profit organization based in Washington, D.C. (www.kaboom.org.) Both recommend that all playground surfaces have at least 9–12 inches of wood chip mulch, sand or pea gravel, or be comprised of mats made of safety tested rubber or rubber like materials, and that no sharp points or edges be present. Landscape ties and timbers are susceptible to cracking and/or splintering.

In 1999 alone, it is estimated that there were more than 200,000 playground-equipment injuries. Most of these injuries occurred when children fell onto a surface that did not adequately protect against the fall. Through organizations such as the CPSC, the American Society of Testing Materials, and the Independent Play Equipment Manufacturers Association, the federal government and playground equipment industry have issued voluntary safety guidelines. There remains, however, no federally mandated standards. Several states, such as California, are moving toward mandated standards to ensure millions of young children will play and learn in safer environments.

It is, therefore, desirable to provide a means for covering new wooden structures and retrofitting existing ones with a protective material to prevent or minimize injuries associated with such structures, such as splinters and injuries sustained in falls onto such structures. The means should preferably be easy to install and aesthetically pleasing.

Prior art wooden beam protective systems are concerned with prolonging the useful life of the wooden beams. For example, some systems utilizing a resilient pad or "sock" of some sort, perhaps having water-removing capability, onto or into which a railroad tie is to be placed, prolong the operational life of the railroad tie in railroad environments. Such systems, however, do nothing to address the falling or splintering hazard that the exposed sections of wooden beams present to people, particularly children.

SUMMARY OF THE INVENTION

The present invention provides an apparatus and method for minimizing the number of injuries attributable to falling onto or splintering from pressure-treated wooden beam members, such as landscape ties or timbers used in play areas and landscape projects, through the use of a resilient cover. The words "ties", "timbers" and "beams" are used interchangeably throughout the description to mean wooden, preferably pressure-treated, structural members.

A wooden member cover in accordance with the present invention is preferably comprised of a moldable or extrudeable waterproof material in the form of a channel having a top wall and two opposing side walls. The combination of channel thickness and composition provides an impact resistance suitable to prevent injuries when one falls upon it. The inner dimensions of the channel are such that the channel fits tightly over the top and sides of a construction beam or timber. The cover may be formed as a single piece, or alternatively assembled from separate pieces.

The material employed is preferably a safety-tested rubber. The material may be provided in any number of aesthetically pleasing colors. The exterior surface of the cover is preferably tactile and non-slip, and may include deformations such as dimples or ridges, or even a diamond plate surface to this end. The material should be capable of receiving securing nails or screws easily, without disturbing the water-tight quality of the cover.

Many play areas are defined by configurations of interconnected and/or abutting landscape ties or timbers (sometimes referred to as "railroad ties"), or smaller pressure-treated wooden beams. In order to provide coverage on configurations having angular bends or corners, it may be necessary to cut or miter portions of the covers to provide a substantially seamless fit to additional covers. Some covers further comprise at least one end wall spanning the two opposing side walls, so that all exposed sides of stand-alone wooden beams may be covered.

Some configurations have landscape ties stacked upon each other, as in a retaining wall. In some of these configurations, the lowest tie may be partially or wholly submerged beneath the ground for support. The present invention provides embodiments of the cover wherein at least one of the opposing side walls has a height equal to the height of the stacked ties. In those embodiments wherein the lower tie is submerged, a portion of the cover is similarly submerged. Some configurations may not have a uniform stacked-tie wall height. For example, a play area wall may be two ties high in one portion, and then gradually (e.g., at 45°) or abruptly slopes down to a one-tie height. The present invention provides a cover that similarly has a non-uniform height to accommodate such configurations.

In another embodiment, the present invention provides a cover that includes an interleaving or mating feature, such as, for example, a dowel-type or tongue-and-groove joint for substantially seamlessly connecting two channels.

In another embodiment, at least one of the opposing side walls has a lower edge that is not flat or parallel to the ground or other surface upon which the wooden beam rests. The lower edge, flat or not, can aid in securing the cover by penetrating the ground to a shallow depth. The lower portion of an opposing side wall may include a lip that either rests upon the ground or buried beneath it, and upon which a securing material (e.g., pea stone, dirt, etc.) may be placed.

The present invention also provides a method of covering new pressure-treated wooden beam configurations and/or retrofitting existing ones so as to reduced injuries and eliminate splintering. The channels are dimensioned so as to fit snugly over the wooden beam(s). They may be fastened by any number of methods. In one approach, an adhesive such as Liquid Nails™ (www.liquidnails.com) may be applied to an inner surface of the walls prior to fitting the channel over a landscape timber. Other methods of fastening the cover to the timber may also be used, such as, for example, nailing or screwing.

BRIEF DESCRIPTION OF THE DRAWING

The advantages of the present invention will be apparent in the following detailed description of the illustrative embodiments thereof, which is to be read in connection with the accompanying drawing, wherein.

DETAILED DESCRIPTION OF THE INVENTION

Figure 1:
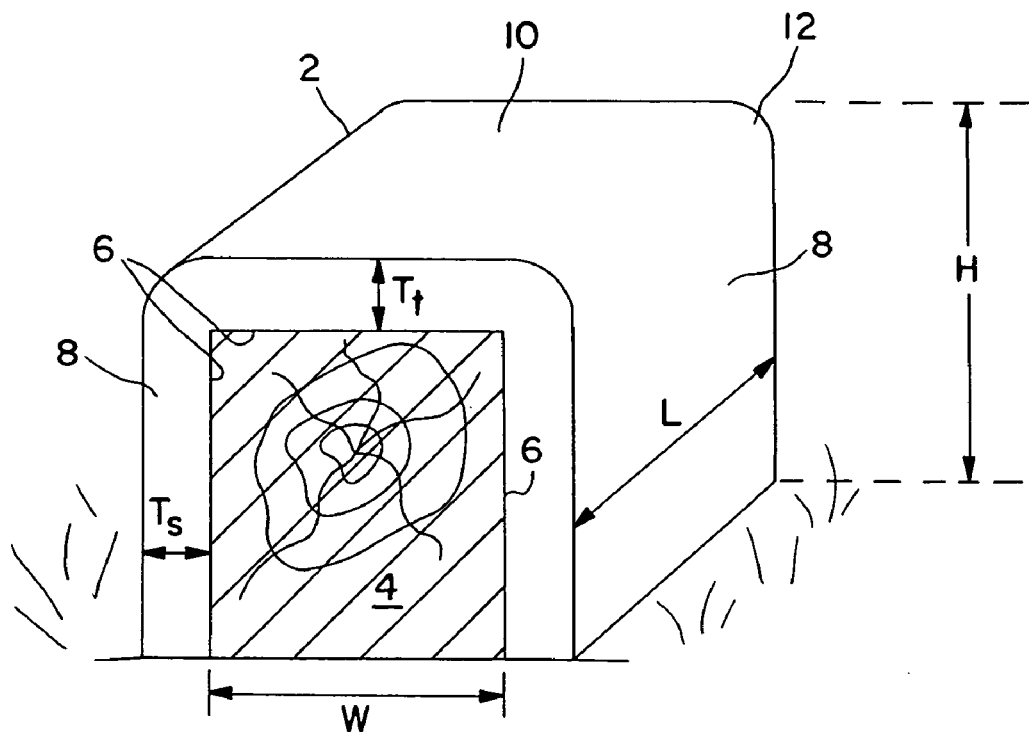
FIG. 1 is an illustration of an end view of a cover in accordance with the present invention.

In the detailed description that follows, landscape timbers are used as examples of the pressure-treated (PT) wooden members in many of the embodiments. This is meant to be illustrative only, as any substantially rectangular beam may be suitable for use with the present invention. Additionally, the figures depict wooden beam resting on a substantially flat surface such as the ground, but in some embodiments the timbers, particularly in stacked configurations, are partially or wholly submerged beneath the ground. Though not illustrated, the present invention is also suitable for use in structures such as boat docks, wherein the wooden beams may be, for example, 2"×6" PT boards that are supported by joist below the boards.

A first embodiment of the present invention is depicted in Figure A, which presents a cross-sectional view (not drawn to scale) of a cover 2 fit securely over a landscape tie 4. Cover 2 is channel-shaped to substantially cover at least three sides 6 of the landscape tie 4. The cover includes two opposing side walls 8 spanned by a top wall 10. Note that the cover 2 includes rounded corners 12 to increase safety.

Cover 2 is comprised of a resilient, waterproof material, such as natural rubber or other elastomeric polymer. The cover has inner dimensions approximating those of the wooden beam it is covering. For example, a typical landscape tie has a height H and width W of about 5⅞" and a length L of about 8–10', whereas "2×6" beams have heights H of approximately 5½" and widths W of approximately 1⅞". In Figure A, top wall 10 has a thickness $T_t$ appearing equal to thickness $T_s$ of the opposing side walls 8. This is not necessarily the case in all channel embodiments. The thickness of the material, and the material's resiliency will determine the ability of the cover to provide cushioning when impacted. The impact resistance required will be a function of several factors, including the likelihood of a fall onto the tie 4 from a low height or a higher one. Determination of whether an appropriate selection of material and dimensions has been made may be performed using CPSC recommendations found in its "Guidelines For Public Playground Equipment", which suggests use of the American Society for Testing and Materials (hereinafter ASTM) F-355 test methodology for evaluating the shock attenuating properties of playground and athletic surfacing systems.

The cover 2 may be manufactured by any means, such as molding or extruding, suitable for the particular resilient material selected. Additional processing, such as painting or roughening of the surfaces of the channel may also be performed. The cover 2 may be formed of a single piece, or alternatively multiple pieces to be fit together (examples of fitting mechanisms are described below) Some manipulation of the cover, as described below, may be performed on-site in order to adapt the cover to the specific wooden beam configuration encountered. The internal surface of the cover 2 is preferably smooth, but may additionally have features (e.g., short deformations or projections of varying shapes) that increase the coefficient of friction between said internal surface and the sides 6 of the wooden beam. A tight fit between the cover and wooden beam will prevent water from entering the interface between the cover and the beam, thereby having a side effect of increasing the useful life of increasing the useful life of the beam. The cover may be fastened to the cover by a number of means, including adhesives, nails, screws and so on, but the fastening method is preferably one that preserves the waterproofing qualities of the cover and prevents leaching of chemicals, such as arsenic, from pressure-treated wood.

Many variations in both the dimensions and features of the cover 2 are possible and are within the scope of the present invention.

Figure 2:
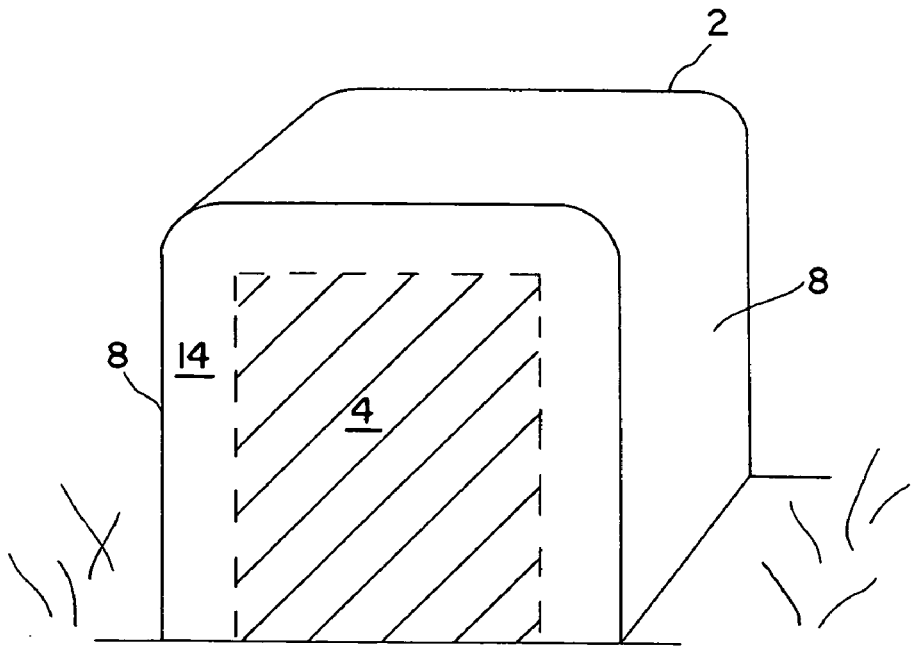
FIG. 2 is an illustration of an end view of an embodiment of a cover having an enclosed end wall.

In some play areas and landscape projects, wooden beams used to define boundaries of such areas occasionally terminate with exposed ends. With reference to FIG. 2, one embodiment of the cover 2 includes an end wall 14 spanning between the opposing side walls 8. A landscape tie 4 is depicted as totally enclosed by the end wall 14. Design considerations similar to those discussed above are equally applicable to the construction of the end wall 14.

Figure 3A:
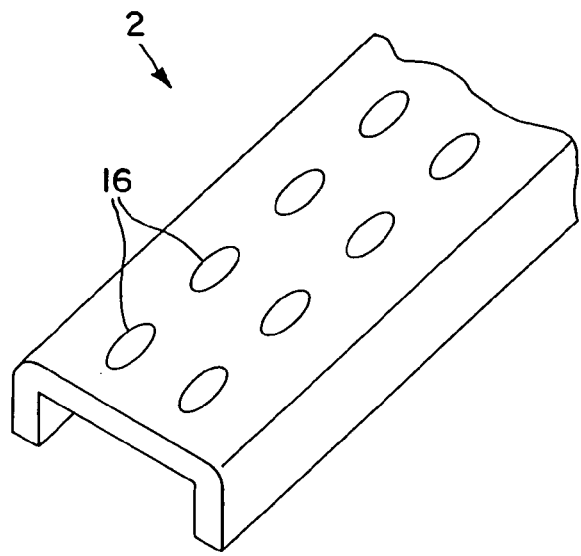
FIGS. 3A, 3B are illustrations of external surfaces of a top wall of a cover having features providing a non-slip surface.
Figure 3B:
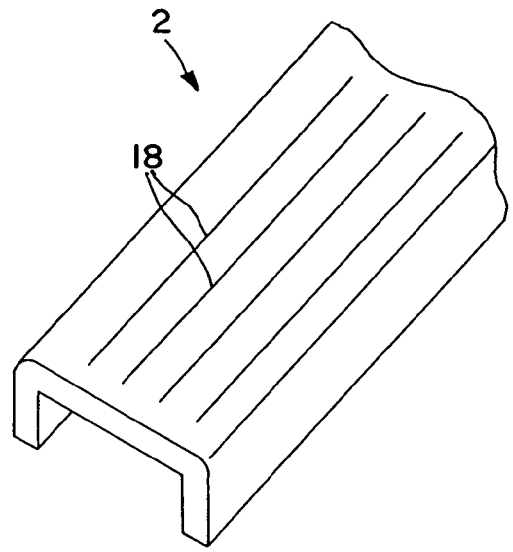

With reference to FIGS. 3A and 3B, the external surface of the cover 2 preferably has a texture that prevents slipping. The non-slip characteristic may occur naturally and/or through the addition of features such as dimples 16 or ridges 18.

Figure 4:
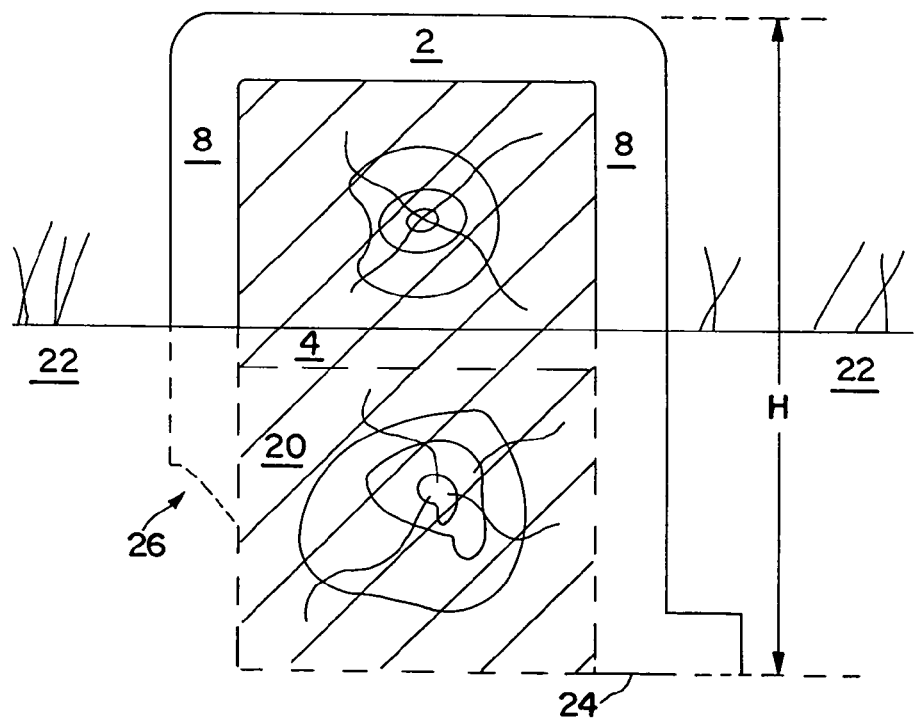
FIG. 4 is an end-view illustration of a cover having dimensions suitable to cover stacked landscape ties, and further illustrating an alternative lower edge design.

With reference to FIG. 4, the landscape tie 4 in some configurations may be stacked upon a second railroad tie 20. To accommodate these configurations, cover 2 may have a height H that is greater than the height of the stacked wooden beams. Note that the opposing side walls 8 may, but do not necessarily, both extend to the ground or other surface 22 upon which the stacked beams rest or in which they are submerged. In addition, one of the side walls has a lower edge 24 that is flat and parallel to the ground or other surface. Both side walls could have such a flat lower edge, or one or both could alternatively have a lower edge 26 that has a segment not parallel to the ground or other surface 22.

Figure 5A:
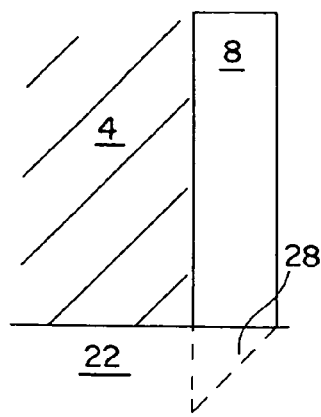
FIGS. 5A–E are end-view illustrations of lower edges of side walls in accordance with various embodiments of the present invention.
Figure 5B:
Figure 5C:
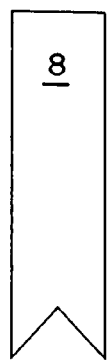
Figure 5D:
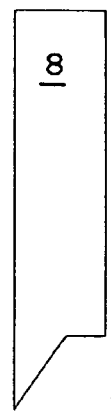
Figure 5E:
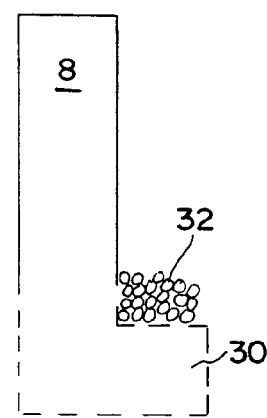

Additional lower edge designs are depicted in FIGS. 5A through 5E. An advantage of having a lower edge including at least part of a wedge 28 is that the side wall 8 may be more easily inserted into the ground or other surface 22 for more secure positioning. FIG. 5E illustrates a lip 30 present at the base of some side walls 8 in accordance with the present invention. The lip 30 is useful in that some material 32, such as pea stone or dirt, may be placed on top of lip 30 to further secure the position of the side wall 8. The lip 30 is illustrated as being positioned below ground level in a trench or hole, with the material 32 being used to back-fill the trench or hole, but alternatively the lip 30 could rest upon surface 22.

Figure 6A:
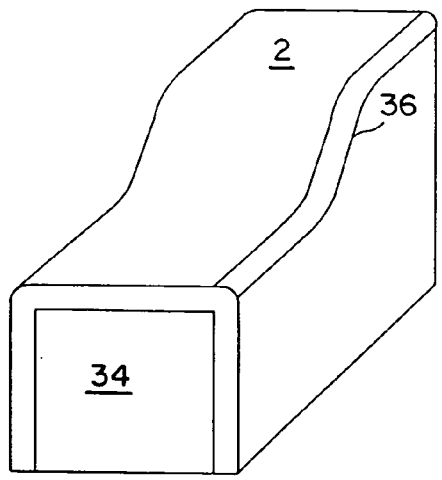
FIGS. 6A, 6B are end-view and side-view illustrations of a cover that has a non-uniform height.
Figure 6B:
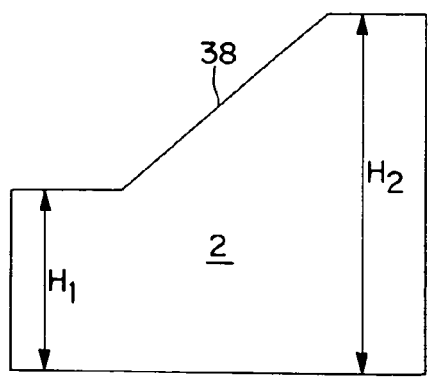

FIGS. 6A and 6B are illustrations representing corner and side views of a cover 2 that is suitable for covering a wooden beam configuration comprised of two landscape ties 34,36. The cover includes a sloping section 38 that traverses the distance between the portion of the cover covering only one tie (and having height H1) and the portion covering two ties (and having height H2.) The illustrations show only a portion of the cover 2 near the transition region and are not drawn to scale. The sloping section 38 may include a more gradual or steep slope, but a 45° angle is typical.

Figure 7A:
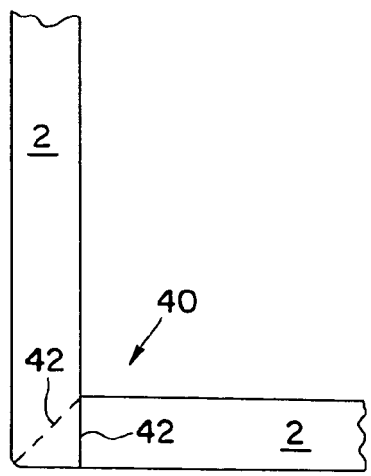
FIGS. 7A, 7Bb are top-view illustrations of covers cut or mitered to cover a corner of a wooden beam configuration.
Figure 7B:
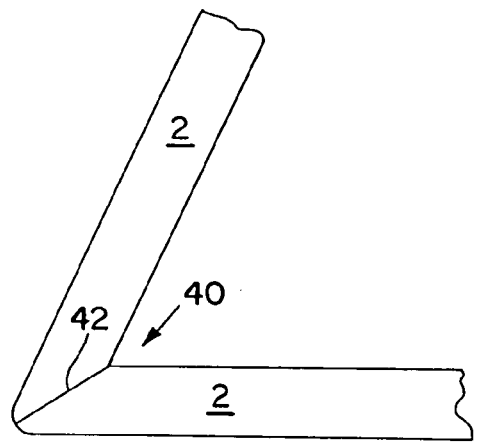
Figure 8:
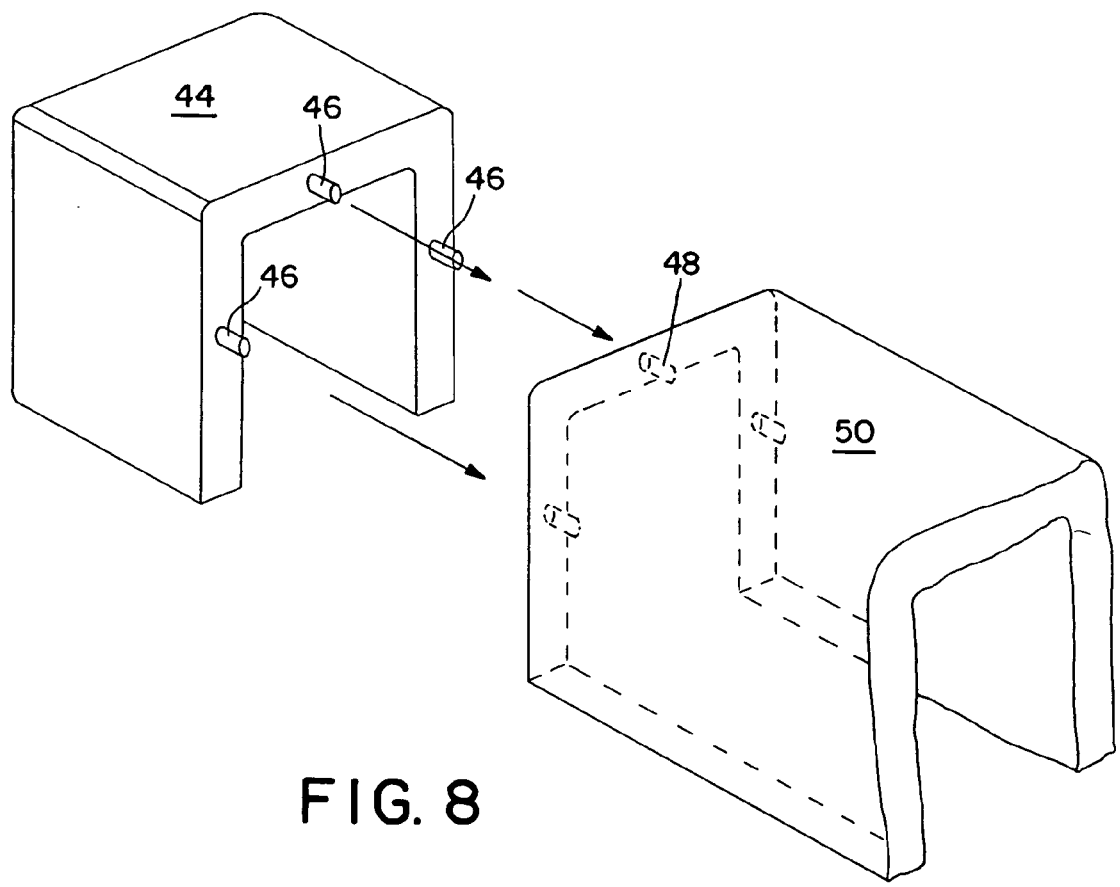
FIG. 8 is an exploded view of two covers having mated interleaving features enabling seamless connection between said covers with proper alignment.

At the work site where the wooden beam configuration is to be retrofit, covers will need to be manipulated to conform to the arrangement of beams. The cover(s) are fastened to the wooden beams via any number of methods that maintain the waterproof characteristic of the cover, including applying an adhesive to the cover before fitting it atop the wooden beam, and/or nailing or screwing the cover to the beams. As shown in FIGS. 7A and 7B, corners 40 may be covered by cutting and/or mitering one or more of the covers 2 to provide a near seamless interface 42.

Where multiple covers are required to cover a long section of a timber configuration, covers such as those depicted in FIG. 8 may be employed. In this embodiment, a first cover 44 has one or more interleaving portions, such as male pins 46 that are mated to a corresponding number of recesses 48 on a second cover 50. Other mated surfaces providing a substantially seamless connection will be readily apparent to artisans. The interleaving portions allow proper alignment between cover segments.

Although the invention has been described with respect to various embodiments, it should be realized this invention is also capable of a wide variety of further and other embodiments. The true scope of the present invention is embodied in the claims that follow.

What is claimed is:

1. A wooden member cover, comprising:

a channel member having a top wall, a pair of opposing side walls, and a pair of opposing vertical end surfaces, said top wall has a non-slip external surface, wherein said non-slip external surface includes dimples;

a cover mating mechanism adapted to each vertical end of said pair of opposing vertical end surfaces, wherein said cover mating mechanism includes a recess into one vertical end surface of said pair of opposing vertical end surfaces, and a pin attached to another vertical end surface of said pair of opposing vertical end surfaces; and said channel member further comprises a lip located in proximity of a base of each side wall of said pair of opposing side walls, whereby securing material may be placed on said lip.

2. A wooden member cover, comprising:

a channel member having a top wall, a pair of opposing side walls, and a pair of opposing vertical end surfaces, said top wall has a non-slip external surface, wherein said non-slip external surface includes dimples;

a cover mating mechanism adapted to each vertical end of said pair of opposing vertical end surfaces, wherein said cover mating mechanism includes a groove within one vertical end surface of said pair of opposing vertical end surfaces, and a tongue attached to another vertical end surface of said pair of opposing vertical end surfaces, and said channel member further comprises a lip located in proximity of a base of each side wall of said pair of opposing side walls, whereby securing material may be placed on said lip.

\* \* \* \* \*